US008886449B2

(12) United States Patent
Vaddadi et al.

(10) Patent No.: US 8,886,449 B2
(45) Date of Patent: Nov. 11, 2014

(54) CALIBRATED HARDWARE SENSORS FOR ESTIMATING REAL-WORLD DISTANCES

(75) Inventors: Sundeep Vaddadi, San Diego, CA (US); John H. Hong, San Clemente, CA (US); Chong U. Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/563,387

(22) Filed: Jul. 31, 2012

(65) Prior Publication Data

US 2013/0197793 A1 Aug. 1, 2013

Related U.S. Application Data

(60) Provisional application No. 61/586,231, filed on Jan. 13, 2012.

(51) Int. Cl.
| | |
|---|---|
| *G06F 17/00* | (2006.01) |
| *G01S 15/08* | (2006.01) |
| *G01S 13/08* | (2006.01) |
| *G01C 15/00* | (2006.01) |
| *G01S 7/40* | (2006.01) |
| *G01S 7/52* | (2006.01) |
| *G01B 11/02* | (2006.01) |
| *G01B 11/00* | (2006.01) |

(52) U.S. Cl.
CPC .............. *G06F 17/00* (2013.01); *G01S 13/08* (2013.01); *G01B 11/02* (2013.01); *G01C 15/002* (2013.01); *G01B 11/00* (2013.01); *G01S 7/4004* (2013.01); *G01B 11/026* (2013.01); *G01S 7/52004* (2013.01); *G01S 15/08* (2013.01); *G01B 11/028* (2013.01)
USPC ........................... 701/300; 702/159; 702/155

(58) Field of Classification Search
CPC ..... G01S 13/08; G01S 7/52004; G01S 15/08; G01B 11/02; G01B 11/00; G01B 11/026; G01B 11/028; G01C 15/002; G01F 17/00
USPC .......... 701/300, 532; 382/106, 141, 291, 294, 382/276, 128, 154; 348/94; 702/159, 155
See application file for complete search history.

(56) References Cited

U.S. PATENT DOCUMENTS 6,724,930 B1 4/2004 Kosaka et al.
6,975,959 B2 12/2005 Dietrich et al.
(Continued)

FOREIGN PATENT DOCUMENTS

| EP | 2037294 A2 | 3/2009 |
| WO | 2009097305 A1 | 8/2009 |

OTHER PUBLICATIONS

International Search Report and Written Opinion—PCT/US2013/020582—ISA/EPO—Apr. 16, 2013.

(Continued)

*Primary Examiner* — Marthe Marc-Coleman
(74) *Attorney, Agent, or Firm* — Kilpatrick Townsend & Stockton LLP

(57) ABSTRACT

In some embodiments, methods and systems are provided for assisting a user in determining a real-world distance. Hardware-based sensors (e.g., present in a mobile electronic device) may allow for a fast low-power determination of distances. In one embodiment, one or more telemetry-related sensors may be incorporated into a device. For example, data detected by a frequently-calibrated integrated accelerometer may be used to determine a tilt of the device. A device height may be estimated based on empirical data or based on a time difference between a signal (e.g., a sonar signal) emitted towards the ground and a corresponding detected signal. A triangulation technique may use the estimated tilt and height to estimate other real-world distances (e.g., from the device to an endpoint or between endpoints).

26 Claims, 7 Drawing Sheets

(56) References Cited

U.S. PATENT DOCUMENTS

| | | |
|---|---|---|
| 7,394,946 B2 | 7/2008 | Dewaele |
| 7,577,286 B2 | 8/2009 | Wilson et al. |
| 7,706,573 B1 | 4/2010 | Motamedi et al. |
| 2004/0008259 A1 | 1/2004 | Gokturk et al. |
| 2004/0051860 A1 | 3/2004 | Honda et al. |
| 2005/0128291 A1* | 6/2005 | Murakami ............. 348/143 |
| 2005/0128465 A1* | 6/2005 | Skultety-Betz et al. ..... 356/4.01 |
| 2007/0058155 A1 | 3/2007 | Booker, Jr. et al. |
| 2008/0124064 A1 | 5/2008 | Klinghult et al. |
| 2008/0166019 A1 | 7/2008 | Lee |
| 2010/0002122 A1* | 1/2010 | Larson et al. ............ 348/333.01 |
| 2010/0074609 A1* | 3/2010 | Kasama et al. ............... 396/147 |
| 2010/0171691 A1* | 7/2010 | Cook et al. .................... 345/156 |
| 2010/0295948 A1 | 11/2010 | Xie et al. |
| 2011/0025845 A1* | 2/2011 | Han et al. ..................... 348/140 |
| 2011/0043515 A1* | 2/2011 | Stathis .......................... 345/419 |
| 2011/0080290 A1* | 4/2011 | Baxi et al. .................. 340/573.1 |
| 2011/0096319 A1 | 4/2011 | Otani et al. |
| 2011/0149041 A1 | 6/2011 | Eccles et al. |
| 2011/0175821 A1 | 7/2011 | King |
| 2011/0199479 A1 | 8/2011 | Waldman |
| 2011/0288818 A1 | 11/2011 | Thierman et al. |
| 2012/0005624 A1 | 1/2012 | Vesely |
| 2012/0069019 A1* | 3/2012 | Richards ....................... 345/421 |
| 2012/0130667 A1* | 5/2012 | Fukushima et al. ............ 702/96 |
| 2012/0194693 A1* | 8/2012 | Samadani et al. ......... 348/222.1 |
| 2013/0059632 A1* | 3/2013 | Roman et al. ..................... 463/7 |
| 2013/0147934 A1* | 6/2013 | Yamane .......................... 348/76 |
| 2013/0157718 A1* | 6/2013 | Johanson et al. .......... 455/556.1 |
| 2013/0187905 A1 | 7/2013 | Vaddadi et al. |
| 2013/0201210 A1 | 8/2013 | Vaddadi et al. |
| 2013/0215116 A1 | 8/2013 | Siddique et al. |
| 2013/0322697 A1* | 12/2013 | Grindstaff et al. ............ 382/107 |

OTHER PUBLICATIONS

"Digitales Video" "Spatial Transformations", http:www.ldy.ei.tum. de/uploads/media/Vorlesung__3.2__SpatialTransformations.pdf, May 2014, pp. 1-20.

Mathworks, "2-D Geometric Transformations", www.mathworks. com/help/images/performing-generat-2-d-spatialtransformations. html, 1994-2013, pp. 1-4.

\* cited by examiner

CALIBRATED HARDWARE SENSORS FOR ESTIMATING REAL-WORLD DISTANCES

CROSS-REFERENCES TO RELATED APPLICATIONS

The present application is a non-provisional patent application, claiming the benefit of priority of U.S. Provisional Application No. 61/586,231 filed on Jan. 13, 2012, entitled, "CALIBRATED HARDWARE SENSORS FOR ESTIMATING REAL-WORLD DISTANCES," which is hereby incorporated by reference in its entirety.

BACKGROUND

Frequently, it is important to identify accurate dimensions of objects in sight. For example, it may useful to determine one's distance from a nearby landmark, a dimension of a room, or a length of a couch. While tape measures allow someone to measure these dimensions, tape measures may not be practical in all circumstances. For example, a distance of interest may be longer than a traditional tape measure, or a person wishing to obtain a measurement may be without a tape measure.

SUMMARY

In some embodiments, methods and systems are provided for assisting a user in determining a real-world distance. Hardware-based sensors (e.g., present in a mobile electronic device) may allow for a fast low-power determination of distances. In one embodiment, one or more telemetry-related sensors may be incorporated into a device. For example, data detected by a frequently-calibrated integrated accelerometer may be used to determine a tilt of the device. A device height may be estimated based on empirical data or based on a time difference between a signal (e.g., a sonar signal) emitted towards the ground and a corresponding detected signal. A triangulation technique may use the estimated tilt and height to estimate other real-world distances (e.g., from the device to a ground-level endpoint or between endpoints). Time differences between emitted and detected signals may further allow for estimation of real-world distances (e.g., from the device to a non-ground-level endpoint or between non-ground-level endpoints).

In some embodiments, a method for estimating a real-world distance is provided. The method can include calibrating a tilt-sensitive sensor of a mobile device and estimating a height of the mobile device. The method can also include receiving tilt-related data from the tilt-sensitive sensor and estimating a tilt of the mobile device based on the received tilt-related data. The method can further include emitting a first signal, detecting a second signal and estimating a distance between the mobile device and an endpoint. At least one of the estimated height and the estimated distance can be based on the detected second signal.

In some embodiments, a system for estimating a real-world distance is provided. The system can include a height estimator for estimating a height of the mobile device, the estimated height being relative to a ground level and a tilt estimator for estimating a tilt of the mobile device. The system can also include a calibrator for calibrating the tilt estimator and a signal emitter and detector for emitting a first signal and detecting a second signal. The system can further include a device-to-endpoint distance estimator for estimating a multi-dimensional distance between the mobile device to an endpoint and a display for presenting one or more distances. At least one of the estimated height and the estimated distance can be based on the detected second signal.

In some embodiments, a system for estimating a real-world distance is provided. The system can include means for calibrating a tilt-sensitive sensor of a mobile device and means for estimating a height of the mobile device. The system can also include means for receiving tilt-related data and means for estimating a tilt of the mobile device based on the received tilt-related data. The system can further include means for emitting a first signal, means for detecting a second signal, and means for estimating a distance between the mobile device and an endpoint. At least one of the estimated height and the estimated distance can be based on the detected second signal.

In some embodiments, a computer-readable medium is provided. The computer-readable medium can contain a program which executes steps of calibrating a tilt-sensitive sensor of a mobile device and estimating a height of the mobile device. The program can also execute steps of receiving tilt-related data from the tilt-sensitive sensor and estimating a tilt of the mobile device based on the received tilt-related data. The program can further execute steps of causing a first signal to be emitted, detecting a second signal; and estimating a distance between the mobile device and an endpoint. At least one of the estimated height and the estimated distance can be based on the detected second signal.

DETAILED DESCRIPTION

In some embodiments, methods and systems are provided for assisting a user in determining a real-world distance. Hardware-based sensors (e.g., present in a mobile electronic device) may allow for a fast low-power determination of distances. In one embodiment, one or more telemetry-related sensors may be incorporated into a device. For example, data detected by a frequently-calibrated integrated accelerometer may be used to determine a tilt of the device. A device height may be estimated based on empirical data or based on a time difference between a signal (e.g., a sonar signal) emitted towards the ground and a corresponding detected signal. A triangulation technique may use the estimated tilt and height to estimate other real-world distances (e.g., from the device to a ground-level endpoint or between endpoints). Time differences between emitted and detected signals may further allow for estimation of real-world distances (e.g., from the device to a non-ground-level endpoint or between non-ground-level endpoints).

Figure 1:
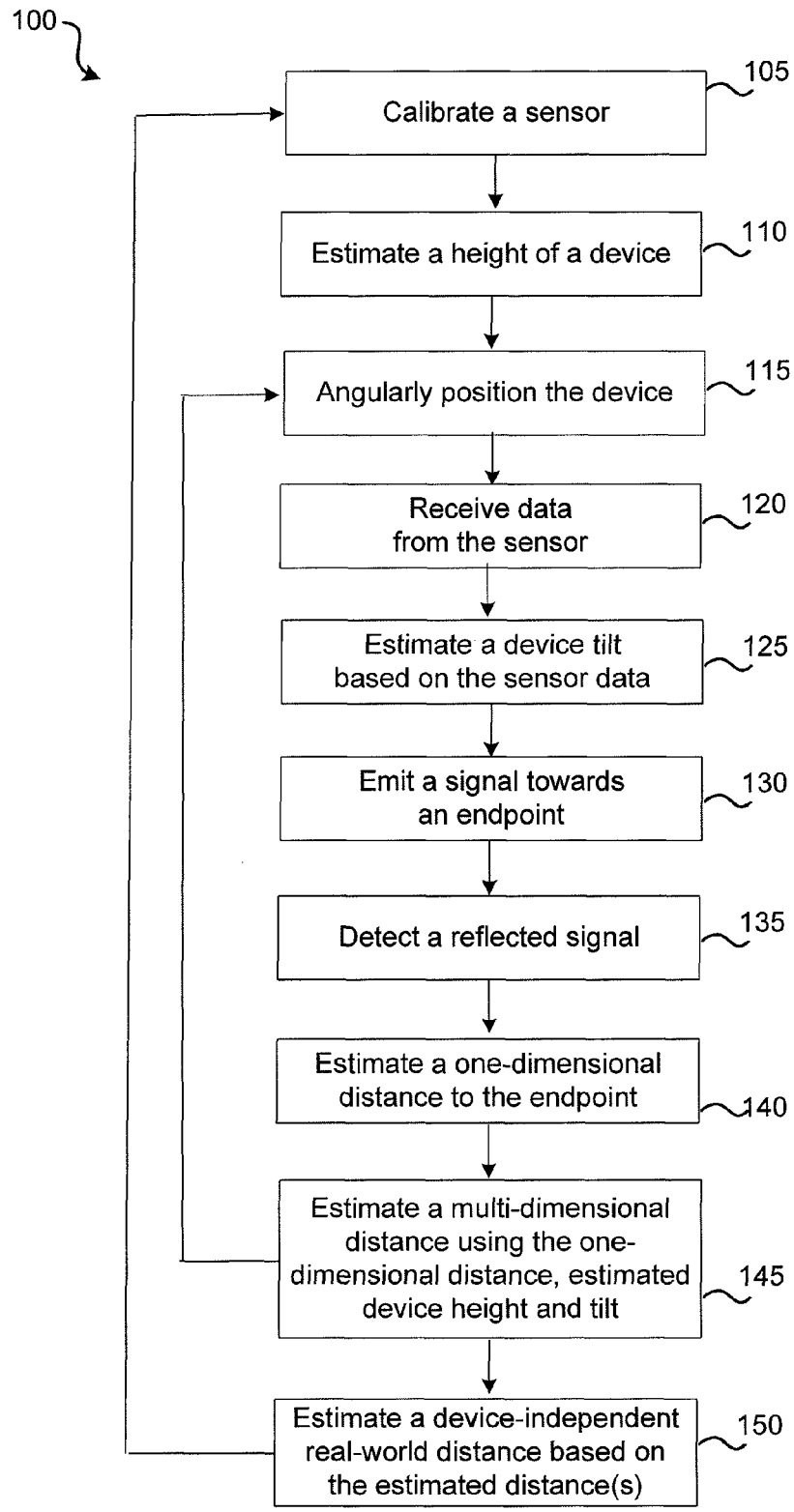
FIG. 1 illustrates a method for determining a real-world distance based at least partly on sensor data according to an embodiment.

FIG. 1 illustrates a method 100 for determining a real-world distance based at least partly on sensor data according to an embodiment. As described in further detail below, part or all of method 100 may be performed by a device, such as a mobile device, a portable device and/or electronic device. For example, part or all of method 100 may be performed by a cellular phone.

At 105, a sensor is calibrated. The sensor may include, e.g., one or more accelerometers or tilt sensors. The sensor may be calibrated by analyzing sensor data. The analyzed sensor data may be data collected while a device was at or was estimated to have been at one or more orientations. For example, a user may have been instructed to orient the device horizontally (e.g., to place the device on a floor) and/or to orient the device vertically (e.g., to place the device against a wall).

As another example, the device may estimate that the device is at a particular orientation. For example, a device may recognize when it is being charged and estimate that it is then at an orientation associated with a charging station. A device may further estimate when it is placed horizontally (e.g., based on closeness of sensor data to horizontally-associated data and/or a lack of movement of the device for a period of time). In some instances, the analyzed sensor data comprises data across a range of orientations. For example, the device may collect data throughout several minutes, several hours or several days. Collected data may be compared to reference data. For example, the reference data may include sensor data that should be associated with particular orientations (e.g., vertical and/or horizontal orientations) and/or distributions of sensor data (e.g., indicating expected relationships between two measurements).

Figure 2A:
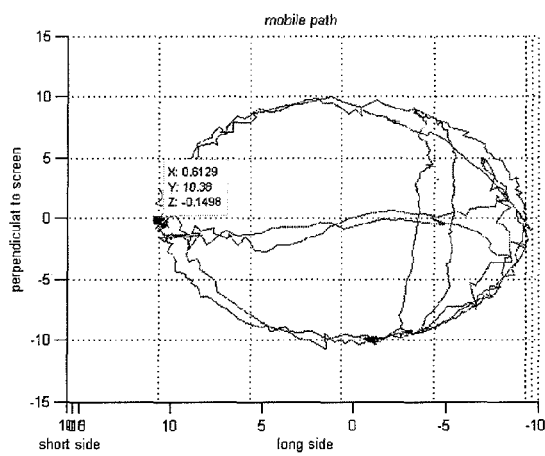
FIGS. 2A-2C show an example of sensor data that may be used for calibration.
Figure 2B:
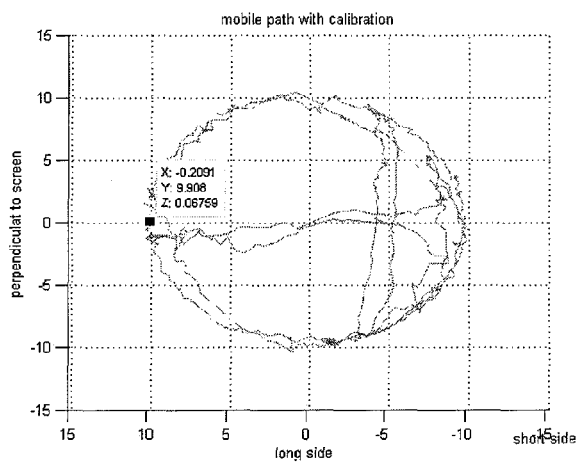
Figure 2C:
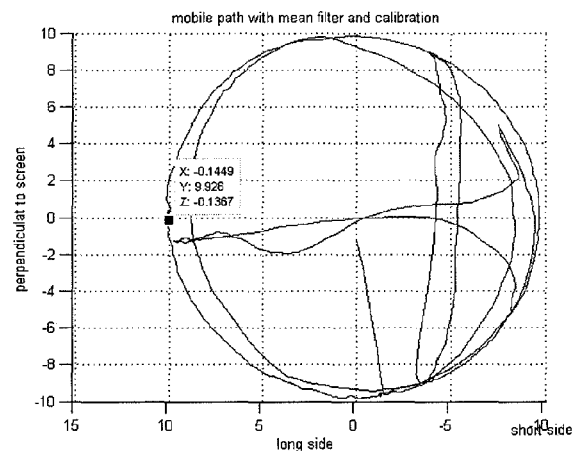

FIGS. 2A-2C show an example of sensor data that may be used for calibration. FIG. 2A shows data collected over a time period. Each measurement is associated with a new data point, and sequential measurements are connected. The x- and y-coordinates of each data point indicate an acceleration measurement along one real-world axis. Thus, for example, the x- and y-coordinates represent accelerations in two directions, the directions being perpendicular to each other. Though not shown, acceleration data may further be collected along a third z-coordinate axis. As shown in FIG. 2A, in this example, the collected data forms an ellipse. A calibration may be determined in order to transform the ellipse into a more circular or a circular shape. For example, FIG. 2B shows an example of the same data after a calibration was performed. The data may be filtered in order to determine the calibration. For example, FIG. 2C shows an example of the same data after both a mean filter and calibration were applied.

At 110, a height of the device may be estimated. The estimated height may include or may be equal to, e.g., an estimated user height, an estimated eye level or an estimated device-use height. The user height may be estimated based on, e.g., an average, median or mode height of: a person, an adult, or an adult of a particular demographic that is a same demographic as a user (e.g., male/female, 20-30 years old, etc.). For example, a user may set a setting that he is a male between the ages of 20-30. His height may be estimated based on this input. In some instances, a user inputs his height and that is used as the estimate. The eye level estimated or device-use height estimated may be equal to the estimated user height (for simplified calculation), be a fraction of the estimated user height, be a fixed distance less than the estimated user height, or be based on a mean, median or mode of eye-level or device-use heights across a population (e.g., all adults, a specific demographic, etc.).

In some instances, the height of the device (e.g., relative to a ground level or floor level, which are generally used interchangeably herein) is estimated based on sensor data. One, more or all sensors used to estimate a height of the device may be different from one, more or all sensors calibrated at 105 (and/or from which data is received at 120, described below).

Figure 3:
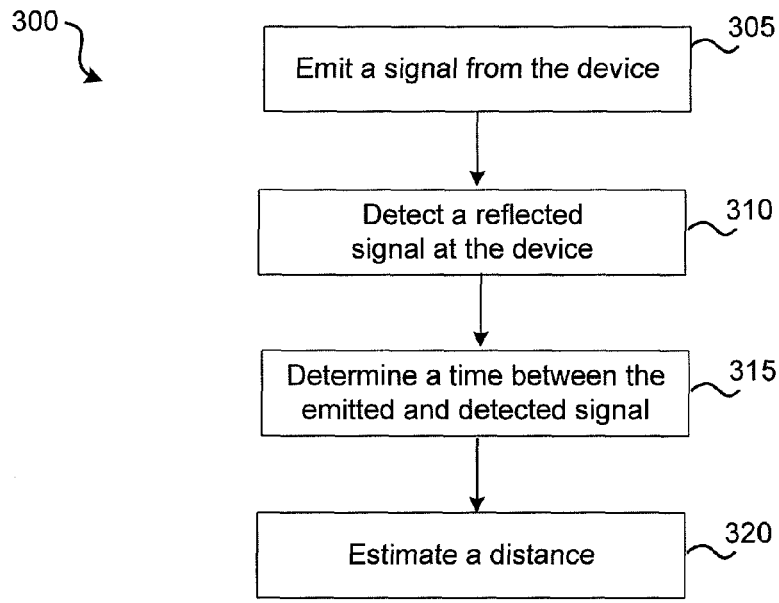
FIG. 3 shows an example of a method that may be used to estimate a distance.

The sensor data used to estimate the height of the device may include data received from, e.g., an acoustic or visual sensor. FIG. 3 provides an example of a method 300 that may be used to estimate a distance. At 305, the device emits a signal (e.g., from a signal emitter, such as a transmitter, antenna, laser, light source, sonar projector, etc.). The signal may, e.g., include an optical signal (e.g., an ultraviolet, visible, near-infrared, or infrared signal), an acoustic signal, an electromagnetic signal, etc. The signal may be reflected and/or scattered by objects along the signal's path. At 310, a reflected signal may be detected (e.g., from a signal detector, such as a receiver, an antenna, camera, an acoustic transducer, etc.). A signal emitter and signal detector may be combined into a single component or provided as separate components. The emitted signal and/or the detected signal may be associated with a time. The times may include absolute or non-absolute times. For example, the time of an emitted signal may be set to "0:00" and the time of a corresponding detected signal may be relative to the emitted-signal time. At 315, a time between the emitted and detected signal may be determined. At 320, a distance may be estimated based on the time difference. For example, signal speed may be estimated (e.g., based on the speed of light or sound), and the distance may be equal to the speed multiplied by the time difference. If the user, e.g., positions the device such that the signal is emitted towards the ground, the estimated distance may be an estimate of the height (relative to the ground) of the device.

At 115, the device is angularly positioned. The device may be positioned such that it may receive data related to a point or endpoint of interest. An endpoint may include any point of interest (e.g., being an endpoint of a vector extending from the device to the point). The endpoint may or may not include a point along a border of an object or a point at a corner. The device may be angled, e.g., such that a detector (e.g., a camera, a sound detector and/or emitter, etc.) is angled towards an endpoint, such as a center, edge or corner of an object.

For example, a user may wish to receive an estimate of a distance of interest, the distance being the distance between the device and an endpoint (e.g., a center along a surface of an object). The user may accordingly orient the device towards the endpoint, and that point may be the endpoint. As another example, a user may wish to receive an estimate of a distance of interest, such as a distance between two endpoints. The user may accordingly orient the device towards a first endpoint and then towards a second endpoint. Multi-dimensional distances between the device and each endpoint may be estimate, and a distance between the endpoints may be subsequently estimated, as described in further detail below.

At 120, data (e.g., tilt-related data) may be received from the sensor that was calibrated at 105. For example, acceleration data or tilt data may be received. The received data may include one-dimensional, two-dimensional or multi-dimensional data. The received data may include calibrated data or a calibration determined at 105 may be applied to the received data.

At 125, a device tilt is estimated based at least partly on the received sensor data. For example, various acceleration data may be associated with corresponding device tilt estimates. The estimation may be further based, e.g., on a look-up table or a formula. The sensors may detect, e.g., acceleration even when the device is stationary due to gravitational pull, which may be accounted for during the estimation of the device tilt. The effect of the gravitational pull may vary as the device is tilted to different angles, allowing for the tilt to be estimated. The estimated device tilt may include one or more (e.g., two) angles.

At 130, a signal is emitted towards an endpoint (e.g., a ground-level endpoint), such as an endpoint described above. The endpoint may include, e.g., a center, edge or corner of an object. As described further below, a user may be interested in receiving a real-world estimate of a distance between two endpoints, and thus, a user may first angularly position the device to one of the endpoints and subsequently to another of the endpoints; signals may be emitted after each of these positionings. The endpoint may or may not be located at a ground or floor level.

The signal may be emitted from an emitter, e.g., a transmitter, antenna, laser, light source, sonar projector, etc. The signal may include, e.g., an optical signal (e.g., an ultraviolet, visible, near-infrared, or infrared signal), an acoustic signal, an electromagnetic signal, etc. In instances for which the device height is estimated based on emission and detection of a signal, the signal emitted at 130 may or may not be the same type of signal emitted to determine device height at 105 and/or may or may not use the same equipment (e.g., transmitter) as used in 105.

At 135, a reflected signal is detected (by a signal detector, e.g., a receiver, an antenna, camera, an acoustic transducer, etc.). In instances for which the device height is estimated based on emission and detection of a signal, the signal detected at 135 may or may not be the same type of signal detected to determine device height at 105 and/or may or may not use the same equipment (e.g., detector) as used in 105. In some embodiments, a plurality of signals are emitted and detected. The time at which a reflected signal is detected may depend on how far the signal traveled before it was reflected by an object. Thus, the time may depend on the how the device was positioned at 115.

At 140, a one-dimensional distance from the device to the endpoint is estimated. The distance may be estimated, e.g., based on a time period between the signal emission at 130, the signal detection at 135 and properties related to an expected signal speed (e.g., speed of light or sound).

In some embodiments, 130-140 are not present in method 100. The one-dimensional distance may be, e.g., determined without emitting a signal towards the endpoint. For example, a triangulation technique may be used to estimate the distance based on the device height estimated at 110 and the device tilt estimated at 125. This may be particularly appropriate when the endpoint is a ground-level endpoint. (See FIG. 4.)

At 145, a multi-dimensional distance is estimated. The multi-dimensional distance may be estimated using the estimated one-dimensional distance and/or device positional information. For example, using an estimated device height (estimated at 105) and device tilt (estimated at 125), a triangulation method may identify a vertical and horizontal separation between the device and the endpoint.

In some embodiments, other distance estimation techniques are used and may replace one or more of, e.g., 130-145. For example, a camera may image a scene. A user may identify one or more endpoints on the screen. A processor may use visual cues, intrinsic camera properties and/or device positional information to estimate a distance between the device and the endpoint(s). This estimated distance may itself be multi-dimensional or may be converted to a multi-dimensional distance (e.g., as described above).

As shown in FIG. 1, 115-145 may be repeated. Thus, the device may be repositioned (e.g., repositioned angularly) and a new multi-dimensional distance may be estimated. For example, at 115, the device may first be angularly positioned towards a first endpoint. Subsequently (e.g., after 120-145 are performed), 115 may be repeated, angularly positioning the device towards a second endpoint (e.g., such that a distance between the first and second endpoints can thereafter be estimated. In some instances, the device is assumed to be or is kept at a substantially constant location during a set of distance estimations.

At 150, a device-independent real-world distance is estimated based on the estimated multi-dimensional distances. For example, a distances estimated at 145 may include a first distance from a device to a first endpoint and a second distance from the device to a second endpoint (e.g., corresponding to lateral positions of an object or boundaries of an open space). A one- two- or three-dimensional distance between the two endpoints may then be determined using these estimates. Part or all of method 100 may be repeated to estimate another device-independent real-world distance. For example, 105-150 may be repeated, as shown in FIG. 1, 110-150 may be repeated, or 115-150 may be repeated.

Though figures (e.g., FIG. 1) may show or imply a particular order of actions, other embodiments may include a different order, may omit actions or may add actions. For example, in some instances, sensor calibration of 105 is performed before estimation of the height of the device of 110. This order may be particularly appropriate, e.g., when calibration requires a user to move the device from an approximate point that it will be at when the signal is emitted towards the endpoint at 130. In some instances, sensor calibration of 105 is performed after estimation of the height of the device of 110. For example, if estimation of the height is based on average device-holding height, then the calibration would not appear to, e.g., itself cause a user to move the device from a previously estimated height.

Figure 4:
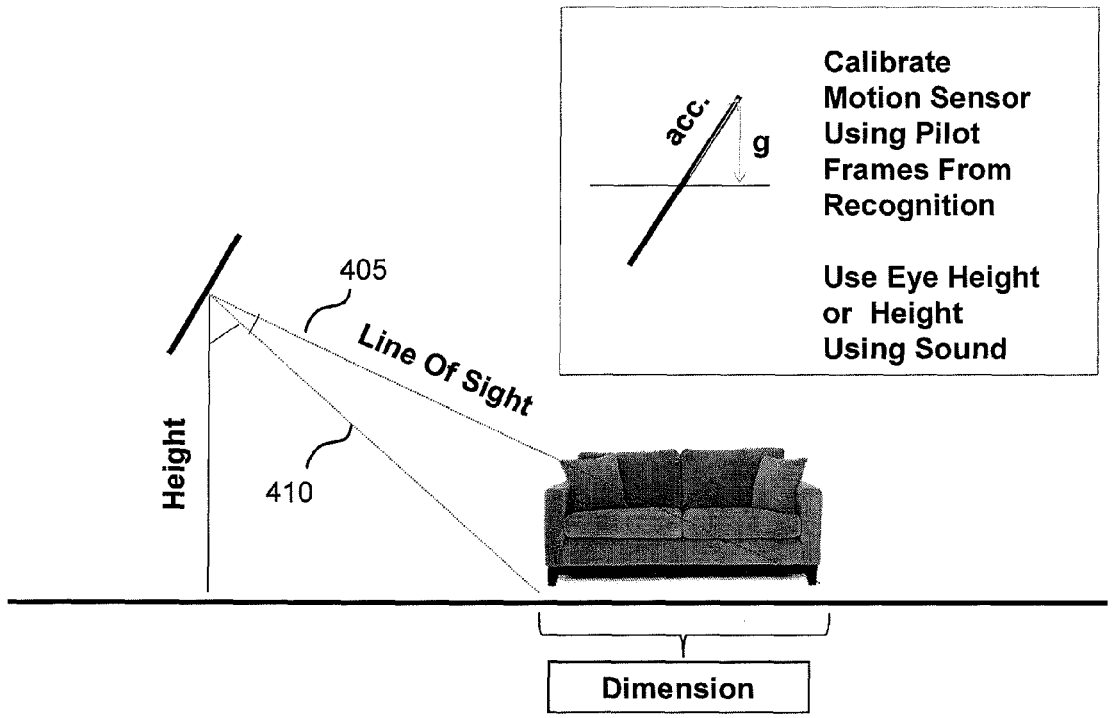
FIG. 4 shows an example of estimating a real-world distance according to an embodiment.

FIG. 4 shows an example of how estimation of a distance 405 between a device and a first endpoint and estimation of a distance 410 between the device and a second endpoint may allow for an estimation to be made of a device-independent distance using geometric properties. For example, as noted in the insert of FIG. 4, a sensor (e.g., a motion sensor or accelerometer) may be calibrated using pilot frames. A tilt of the device (relative to a up-down axis) may be estimated based on sensor data. The height of the device may then be estimated, e.g., based on eye height or a time difference between emitted and detected sound.

A user may use, e.g., a visible light projected towards a temporary endpoint or an indicator of a temporary endpoint projected on a display showing a real-time image of the screen to adjust a position of the temporary endpoint. Once satisfied with the position, the user may select an option to indicate that the endpoint has been identified.

Using the height and tilt estimations, a one- or two-dimensional distance 405 from the device to a first endpoint and a one- or two-dimensional distance 410 from the device to a second endpoint may be estimated. Further a dimension of an object between the first and second endpoints may also be estimated (e.g., by identifying a difference between horizontal components of the two distances). Use of sensor data may allow for distance determinations that, e.g., could not be calculated based solely on visual data and/or may provide distance estimations that are more accurate than determinations based solely on visual data.

Figure 5:
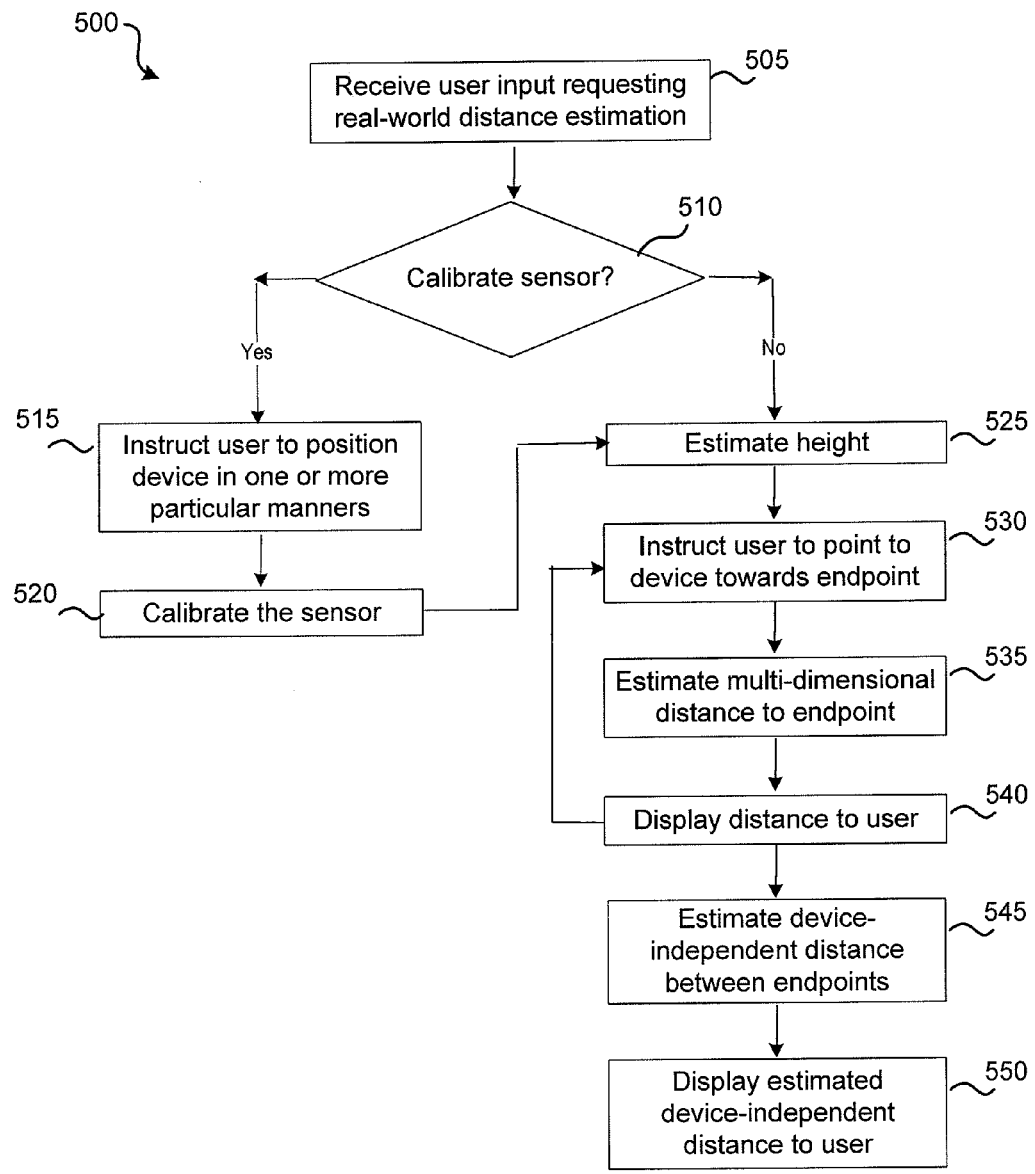
FIG. 5 shows an example of a method for interacting with a user to estimate a distance of interest.

FIG. 5 shows an example of a method 500 for interacting with a user to estimate a distance of interest. In some embodiments, all or part of method 500 is performed on a device (e.g., a portable device, mobile device, electronic device, cellular phone, etc.). At 505, a user input is received. The input may indicate that the user wishes to estimate a real-world distance. The request may include, e.g., an indication that the user wishes to receive an estimation of a device-to-endpoint distance and/or an estimation of a device-independent distance. The input may include, e.g., initiation of a program. The input may include touching or selecting an icon or button, a key command, etc. The input may be received via a user input component, such as a touchscreen display, a keyboard, a mouse, etc.

At 510, it is determined whether to calibrate (or re-calibrate) a sensor. The sensor may include, e.g., one or more accelerometers or tilt sensors. Frequent calibration may improve distance estimation (e.g., due to positional shifts of the sensor(s) within a device). Meanwhile, in some embodiments, calibration frequency is limited, e.g., to reduce user inconvenience, processing expenditure, etc.

In some instances, the sensor is calibrated before every distance estimation or before every device-independent distance estimation. Thus, in some instances, method 500 does not include an explicit calibration decision and may automatically progress from 505 to 515. In some instances, the sensor is calibrated following some or all initiations of a distance-estimation program. In some instances, it is determined whether to calibrate the sensor based on, e.g., time since a previous calibration, user preferences, and/or a degree of a previous calibration. For example, it may be determined to calibrate the sensor if a time period since a previous calibration exceeded a threshold (e.g., 1 hour, 2 hours, 6 hours, 12 hours, 24 hours, 2 days, one week, two weeks, one month, etc.), a user indicated that calibrations could or should be frequently performed (e.g., to increase distance-estimation accuracy) and/or if previously determined calibrations exceeded a threshold.

If it is determined to calibrate the sensor, method 500 may continue to 515, at which a user is instructed to position a device (e.g., housing the sensor and/or a cellular phone) in one or more particular manners. The instruction may include graphics or text presented on a display of a device housing the sensor. In one embodiment, the user is instructed to place the device on the floor (or a flat horizontal surface) and then against a wall (or a flat vertical surface). As described above, in some embodiments, the user need not position the device in particular manner(s). For example, data may be collected over a time period to identify relationships between data types (e.g., see FIGS. 3A-3C and the associated text) and/or during a time period at which it is predicted that the device is at a particular position (e.g., while it is in a charging station).

At 520, the sensor may then be calibrated. In some instances, calibration comprises identifying and/or storing one or more calibration scaling factors, coefficients, and/or linear or nonlinear equations. The calibration may be determined in any manner described herein or known in the art. The calibration may be based on sensor data (e.g., accelerometer data) received after the user positioned the device at 515 or received during another time period as described above.

If it is determined that the sensor need not be calibrated and/or following a calibration (though, in some embodiments, a calibration may be performed after 525-550), method 500 continues to 525. At 525, a height (e.g., a height of the device relative to ground) is estimated. For example, the height may be estimated using a technique described with respect to FIG. 1. In one instance, a user may be instructed to orient the device in a particular manner such that a signal is emitted from the device directly downwards to the ground, reflected from the ground, and detected by the device. A time difference between the emitted and detected signals may be used to estimate the height. In one instance, the height is estimated based on a mean, median or mode eye level across a demographic or population.

At 530, the user may be instructed to point the device or a part of the device towards an endpoint. For example, a text such as "Point the top of the device to an end of the distance to be measured" may be displayed on a screen of the device. In some instances, the device comprises a laser configured to output visible light, such that the user may see where the device or component of the device is pointing. Once satisfied with the location of the endpoint (based on an observed laser-light location), the user may select an option to capture data (e.g., time stamps of emitted and detected signals). In some embodiments, no explicit instruction to point the device to the endpoint is provided though it may be generally understood to do so based on other cues (e.g., icons, a laser light illumination of a point, etc.).

At 535, a multi-dimensional distance from the device to the endpoint may be estimated. The estimation may include any features as disclosed with respect to FIG. 1. For example, a signal may be emitted from the device and subsequently detected by the device. A time difference between the emitted and detected signal may be used to estimate a one-dimensional distance. Further, a measurement (e.g., an acceleration measurement) may be obtained from the sensor, which may be used to estimate a device tilt. Based on the estimated device tilt, one-dimensional distance, and estimated height, the multi-dimensional distance may be estimated (e.g., using a triangulation method).

At 540, the distance may be displayed to the user. In some instances, only part of the distance is displayed. For example, the displayed distance may include a one-dimensional direct distance separating the device and the endpoint, a horizontal separation between the device and endpoint, and/or a vertical separation. In some instances, no such distance is displayed.

One, more of all of 530-540 may be repeated, such that a distance to a second endpoint is estimated. At 545, a distance between the endpoints may be estimated. Thus, a device-independent distance may be estimated. The device-independent distance may be a one- two- or three-dimensional distance and/or may include, e.g., a horizontal separation, an absolute separation, a vertical separation, etc.

At 550, the estimated device-independent distance is displayed to the user. In some instances, a numeric estimate (e.g., with units) is displayed. In some instances, the estimated device-independent distance is superimposed on an image. Though not shown in FIG. 5, in some instances, a sensor calibration, height estimation, estimated one-dimensional distance, estimated multi-dimensional distance from 535, and/or estimated device-independent distance n is stored or transmitted (e.g., over a wireless network).

Figure 6:
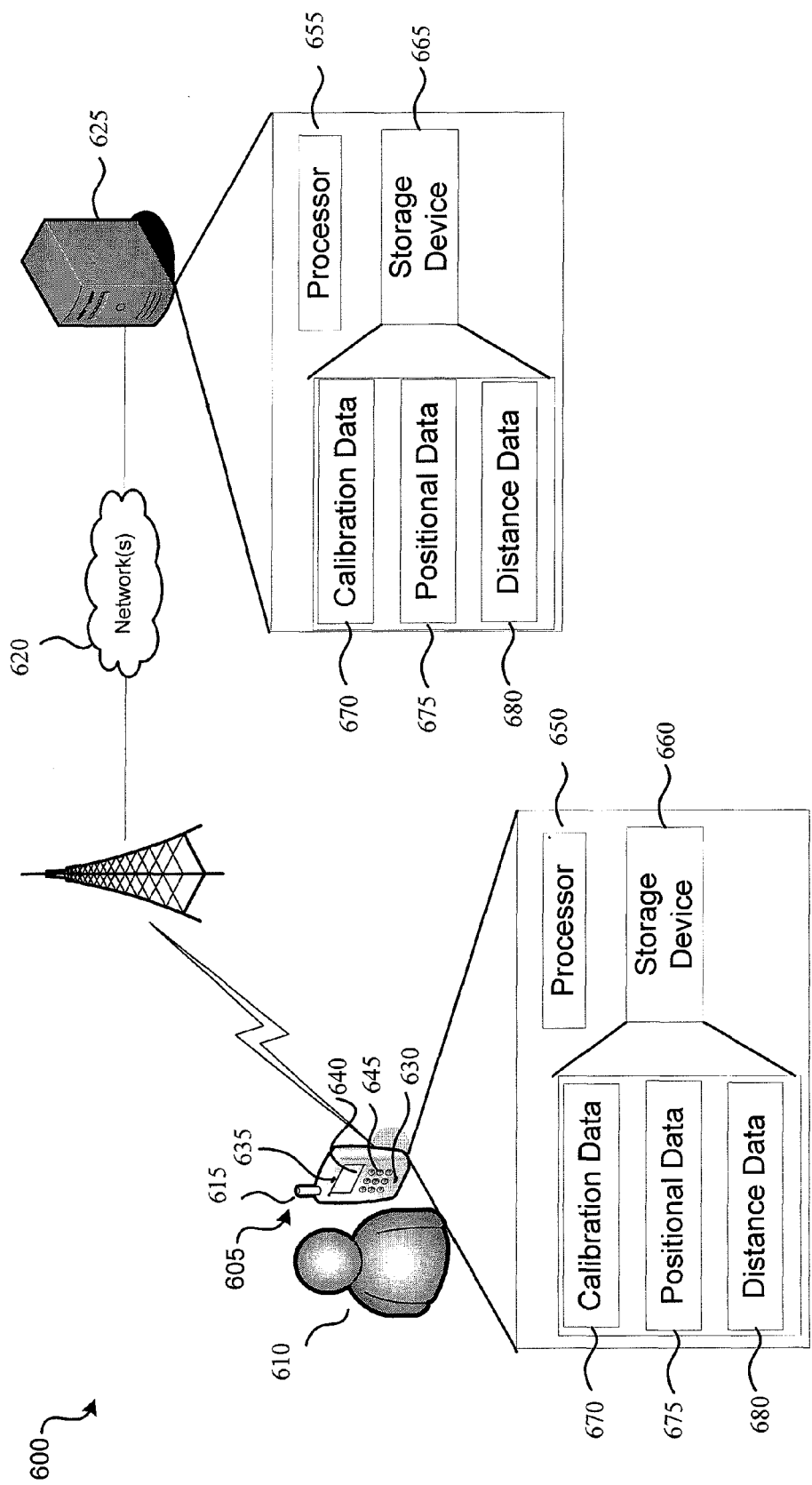
FIG. 6 shows a system for estimating a real-world distance according to an embodiment.

FIG. 6 shows a system 600 for estimating a real-world distance according to an embodiment. The system may include a device, which may be portable device, mobile device, electronic device, etc. (e.g., a cellular phone, smart phone, personal digital assistant, tablet computer, laptop computer, digital camera, handheld gaming device, etc.). As shown, system 600 includes a device 605 (e.g., cellular phone) that may be used by a user 610. Device 605 may include a transceiver 615, which may allow the device to send and/or receive data and/or voice communications. Device 605 may be connected (e.g., via transceiver 615) to a network 620 (e.g., a wireless network and/or the Internet). Through the wireless network, device 605 may be able to communicate with an external server 625.

Device 605 may include a microphone 630. Microphone 630 may permit device 605 to collect or capture audio data from the device's surrounding physical environment. Device 605 may include a speaker 635 to emit audio data (e.g., received from a user on another device during a call, or generated by the device to instruct or inform the user 610). Device 605 may include a display 640. Display 640 may present user 610 with real-time or non-real-time images. Display 640 may present instructions to user 610, the instructions being related to actions required for distance estimations. Display 640 may present estimated distances to user 610. Device 605 may include user-input components 645. User-input components 645 may include, e.g., buttons, a keyboard, a number pad, a touchscreen display, a mouse, etc. User-input components 645 may allow, e.g., user 610 to request a distance estimation, identify types of endpoints, request a calibration, skip a calibration, etc.

Though not shown, device 605 may also include an imaging component (e.g., a camera). The imaging component may include, e.g., a lens, light source, etc. Device 605 may include a sensor, such as an accelerometer or tilt sensor. Device 605 may include a signal-transmitting component, such as a transmitter, antenna, laser, light source, sonar projector, etc. Device 605 may include a signal-detecting component, such as a receiver, an antenna, camera, an acoustic transducer, etc.

Device 605 may include a processor 650, and/or device 605 may be coupled to an external server 625 with a processor 655. Processor(s) 650 and/or 655 may perform part or all of any above-described processes. In some instances, sensor calibration, estimation of device positional information (e.g., height and/or tilt), estimation of a one-dimensional distances to one or more endpoints, and/or estimation of a distance between endpoints is performed locally on the device 605.

Device 605 may include a storage device 660, and/or device 605 may be coupled to an external server 625 with a storage device 665. Storage device(s) 660 and/or 665 may store, e.g., calibration data (e.g., how simultaneous sensor measurements should be related when the device is calibrated, look-up tables, past calibrations, times of past calibrations, current calibration variables or equations, etc.), positional data (e.g., average device height, device heights estimated based on emitted/detected signals, signal data used to estimate device height, estimated device tilts, relationships between sensor data and tilts, look-up tables, etc.), and/or distance data (e.g., estimated one-dimensional distances, estimated multi-dimensional distances, estimated device-independent distances, etc.).

For example, sensor data may be captured. Using calibration variables and/or relationships stored in a calibration database 670 and the sensor data, a calibration (e.g., coefficients, an equation, a model, etc.) may be determined (and, in some instances, also stored in the database). Additional sensor data may be captured (which may already be calibrated and/or subject to calibration processing). A position (e.g., height and angular positions) of the device may be estimated (e.g., using the additional sensor data). For example, acceleration data collected by a calibrated accelerometer or collected and then subjected to calibration processing may allow for estimation of a device angle. As another example, a device height may be estimated (e.g., based on time differences between emitted and received signals and/or average device height). The positional data (e.g., estimated device height and/or angle) may be stored in a positional database 675. One or more distances from the device to an end point may be estimated (e.g., based on device positional data, time differences between emitted and received signal, etc.). These estimated distances may be stored in a distance database 680. Multiple device-to-endpoint distances may be used to estimate a real-world device-independent distance (e.g., between multiple endpoints). The estimated distance may also or alternatively be stored in distance database 680.

Figure 7:
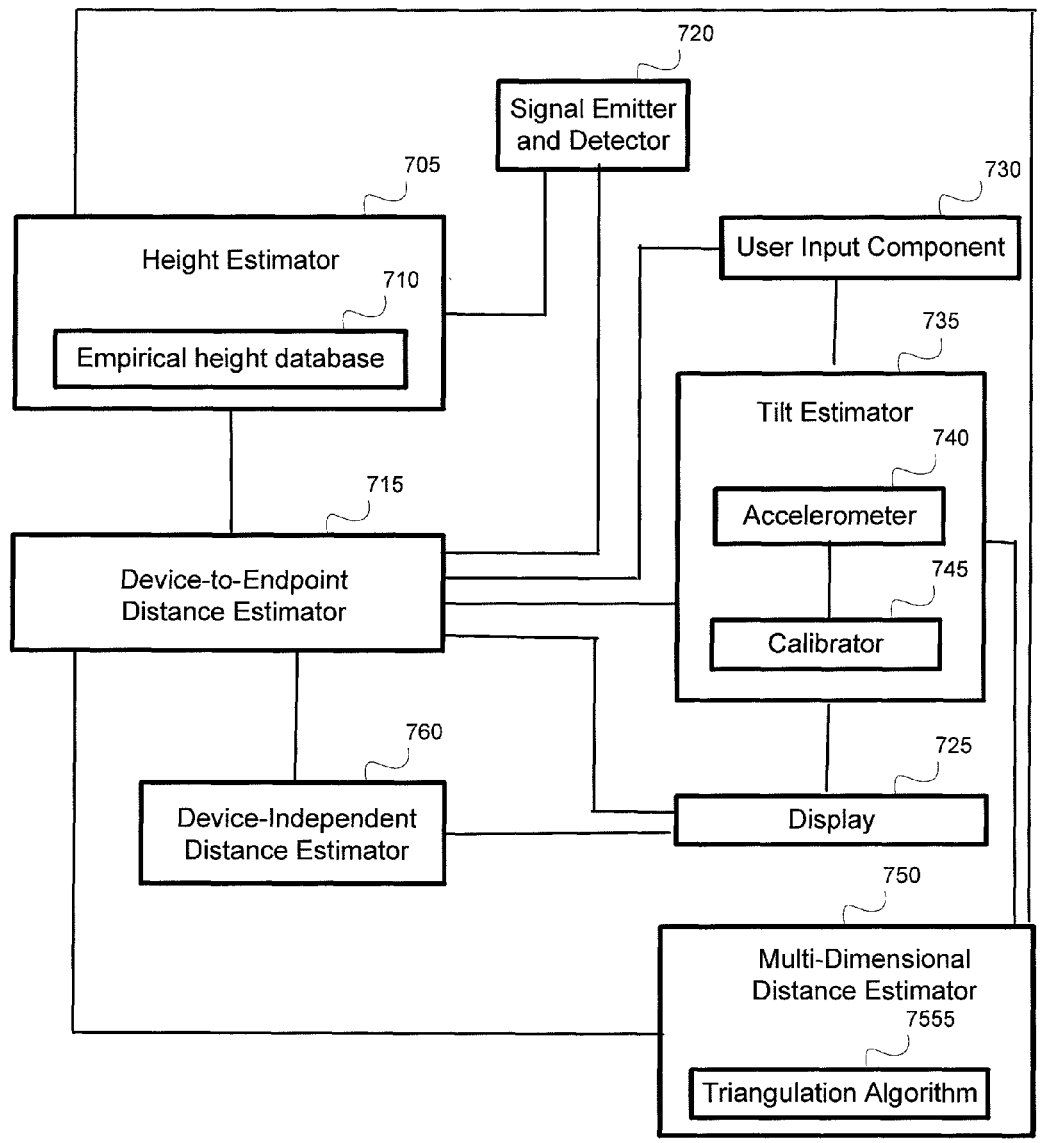
FIG. 7 shows a system for estimating a real-world distance according to an embodiment.

FIG. 7 shows a system 700 for estimating a real-world distance according to an embodiment. Part or all of system 700 may be included in a portable device, mobile device, electronic device, etc. (e.g., a cellular phone, smart phone, personal digital assistant, tablet computer, laptop computer, digital camera, handheld gaming device, etc.). As shown, system 700 includes a height estimator 705. Height estimator 705 may estimate a height of a device (e.g., a cellular phone), such as a height of the device relative to a ground or floor level. The height may be estimated, e.g., based on empirical height data. The empirical height data may be accessed from an empirical height database 710. The empirical height data may include a single predicted height (e.g., based on average heights of users handling of a device), a demographic-specific predicted height, a height predicted using an algorithm or model, etc.

In some instances, height estimator 705 estimates a height using sensor data (with or without also using empirical data). For example, height estimator 705 may be coupled to a device-to-endpoint distance estimator 715. Height estimator 705 and device-to-endpoint distance estimator 715 are each depicted as being coupled to a signal emitter and detector 720. As used herein, a coupling of a first component to a second component (e.g., coupling between height estimator 705 and signal emitter and detector 720 or coupling between device-to-endpoint distance estimator 715 and signal emitter and detector 720) can include an instance in which the first component comprises the second component (e.g., height estimator 705 comprising signal emitter and detector 720 or device-to-endpoint distance estimator 715 comprising signal emitter and detector 720).

Signal emitter and detector 720 (or another component) may instruct a user to orient the device such that a portion of the device (e.g., a signal emitter and/or detector) is directed towards the ground. The user may be so instructed via instructions presented on a display 725. The user may confirm that the device is oriented as instructed via a user input component 730 (e.g., a touchscreen or keypad). Signal emitter and detector 720 may then emit a first signal and detect a second signal by signal emitter and detector 720, as described in further detail herein. It will be understood that, though FIG. 7 shows system 700 as include a single signal emitter and detector 720, other embodiments include a signal emitter separate from a signal detector. Other variations are also possible (e.g., that height estimator 705 comprise signal emitter and detector 720 or system 700 includes multiple signal emitters and detectors 720). Height estimator 705 may identify a time difference between the emitted and detected signals and estimate a distance between the device and the ground based on the time difference. The estimated distance may be identified as an estimated height of the device.

System 700 may further include a tilt estimator 735. Tilt estimator 735 may include a sensor, such as an accelerometer 740 or a tilt sensor. The sensor may be coupled to a calibrator 745. System 700 may be configured to repeatedly calibrate the sensor. For example, a user may be instructed (e.g., via display 725) to orient the device in one or more particular manners (e.g., horizontally and/or vertically). The user may confirm that the device has been oriented as instructed using user input component 730. Calibrator 745 may use sensor data (e.g., data from accelerometer 740) to calibrate the sensor. Thus, in some embodiments, system 700 includes two types of sensors (e.g., signal emitter and detector 720 and accelerometer 740) and two types of sensor data (e.g., information associated with signals emitted and received by signal emitter and detector 720 and data from accelerometer 740).

Tilt estimator 735 may (following one or more calibrations) estimate a tilt of the device. For example, tilt estimator 735 may estimate a tilt of the device while the device is angularly positioned towards an endpoint. The user may indicate that he wishes the tilt to be estimated at a particular instance via user input component 730.

System 700 may include device-to-endpoint distance estimator 715. Device-to-endpoint distance estimator 715 may estimate a distance from the device to an endpoint. The endpoint may include an endpoint at a ground or floor level directly below the device (e.g., to estimate a height of the device) or a another endpoint (e.g., at a ground or floor level not directly below the device). For example, based on a height estimated by height estimator 705 and a tilt estimated by a tilt estimator 735, device-to-endpoint distance estimator 715 may estimate a distance to a ground-level endpoint using a triangulation technique (e.g., by applying the Pythagorean theorem). As another example, signal emitter and detector 720 may identify one or more times (e.g., a time difference) associated with an emitted signal and detected signal, and a one-dimensional distance may be estimated based on an estimated velocity of the signal and using an equation relating signal velocity and time. The one-dimensional distance may be converted into a multi-dimensional distance by multi-dimensional distance estimator 750.

Multi-dimensional distance estimator 750 may convert the one-dimensional distance to the multi-dimensional distance, e.g., based on an estimation of a height of the device received from height estimator 705 and/or estimation of a tilt of the device received from tilt estimator 735. For example, multi-dimensional distance estimator 750 may include a triangulation algorithm 755. If a height and tilt of the device is assumed to be known, and if it is assumed that the user has oriented the device towards a ground-level endpoint, a horizontal and vertical separation between the device and the endpoint may be estimated.

Using a plurality of device-to-endpoint distance estimations (e.g., estimated by device-to-endpoint distance estimator 715), a device-independent distance may be estimated by device-independent distance estimator 760. For example, the device-independent distance estimator may identify a difference between horizontal components of two distances estimated by device-to-endpoint distance estimator 715, each corresponding to a different endpoint. Thus, e.g., a user may orient a device towards a first end of an object and subsequently towards a second opposite end of the object, and the distance between the ends of the object may be estimated.

Figure 8:
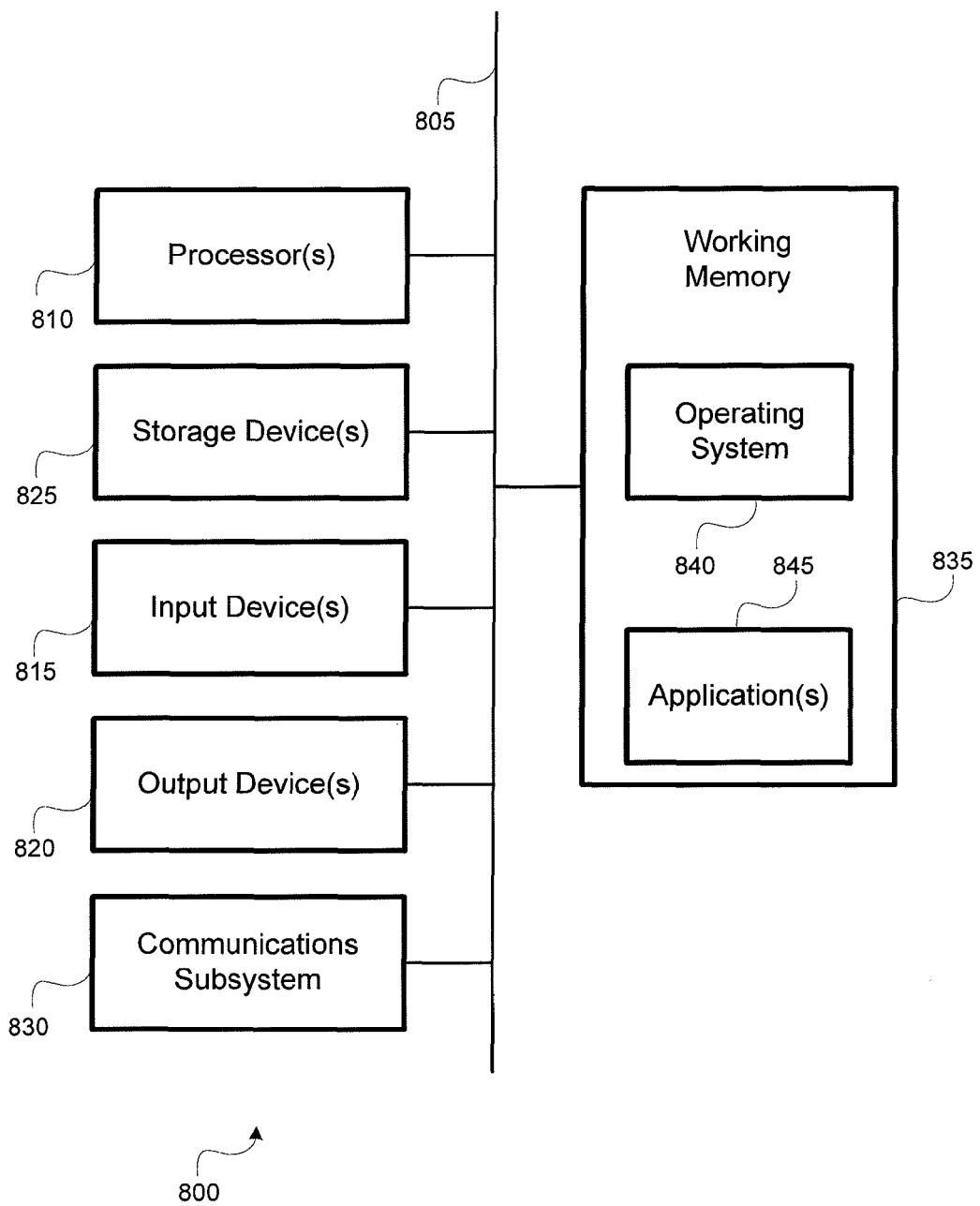
FIG. 8 illustrates an embodiment of a computer system.

A computer system as illustrated in FIG. 8 may be incorporated as part of the previously described computerized devices. For example, computer system 800 can represent some of the components of the mobile devices and/or the remote computer systems discussed in this application. FIG. 8 provides a schematic illustration of one embodiment of a computer system 800 that can perform the methods provided by various other embodiments, as described herein, and/or can function as the external server 625 and/or mobile device 605. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as the system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 800, various computer-readable media might be involved in providing instructions/code to processor(s) 810 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosed embodiments. Also, a number of steps may be undertaken before, during, or after the above elements are considered. Accordingly, the above description does not bound the scope of the claims.

What is claimed is:

1. A method for estimating a real-world distance with a mobile device, the method comprising:
   calibrating a tilt-sensitive sensor of the mobile device;
   orienting the mobile device toward an endpoint;
   estimating a height of the mobile device;
   receiving tilt-related data from the tilt-sensitive sensor;
   estimating a tilt of the mobile device based at least in part on the received tilt-related data;
   emitting, from the mobile device, a first signal;
   detecting a reflected signal; and
   estimating, via the mobile device, a multi-dimensional distance between the mobile device and an endpoint,
   wherein the estimated multi-dimensional distance is based on the reflected signal, estimated tilt and estimated height.

2. The method of claim 1, further comprising:
   receiving second tilt-related data from the tilt-sensitive sensor;
   estimating a second tilt of the mobile device based on the received tilt-related data;
   emitting a second signal to a second endpoint;
   detecting a second reflected signal; and
   estimating a second multi-dimensional distance between the mobile device and a second endpoint based on the second reflected signal, estimated tilt and estimated height.

3. The method of claim 2, further comprising: estimating, a device-independent distance between the first and second endpoints based on the estimated multi-dimensional distance and the estimated second multi-dimensional distance.

4. The method of claim 3, further comprising: re-calibrating the tilt-sensitive sensor prior to each subsequent estimation of other multi-dimensional distances.

5. The method of claim 1, wherein the endpoint comprises a ground-level endpoint.

6. The method of claim 1, further comprising:
emitting a third signal towards a second endpoint, the second endpoint predicted to be directly below a signal-emitting component of the mobile device;
detecting a fourth signal.

7. The method of claim 1, wherein the first signal and the second signal each comprise a sonar signal.

8. The method of claim 1, wherein calibrating the tilt-sensitive sensor comprises:
receiving first calibration data, the first calibration data being different from the tilt-related data;
associating the first calibration data with a horizontal orientation of the mobile device;
receiving second calibration data, the second calibration data being different from the tilt-related data and from the first calibration data; and
associating the second calibration data with a vertical orientation of the mobile device.

9. The method of claim 1, wherein the tilt-sensitive sensor comprises an accelerometer.

10. The method of claim 1, further comprising illuminating the endpoint with a laser beam prior to estimating the distance.

11. The method of claim 1, wherein the method is performed in its entirety on the mobile device.

12. The method of claim 11, wherein the mobile device comprises a cellular phone.

13. A system for estimating a real-world distance, the system comprising:
a height estimator for estimating a height of the mobile device, the estimated height being relative to a ground level;
a tilt estimator for estimating a tilt of a mobile device and orienting the mobile device toward an endpoint;
a calibrator for calibrating the tilt estimator;
a signal emitter and detector for emitting a first signal and detecting a reflected signal;
a mobile device-to-endpoint distance estimator for estimating a multi-dimensional distance between the mobile device to the endpoint; and
a display for presenting one or more distances,
wherein at least one of the height estimator and the mobile device-to-endpoint distance estimator is coupled to the signal emitter and detector.

14. The system of claim 13, further comprising:
a device-independent distance estimator for estimating a distance between the endpoint and second endpoint, the device-independent distance estimator being coupled to the mobile device-to-endpoint distance estimator.

15. The system of claim 13, wherein the tilt estimator comprises an accelerometer.

16. The system of claim 13, wherein the height estimator is coupled to the signal emitter and detector.

17. A system for estimating a real-world distance, the system comprising:
means for calibrating a tilt-sensitive sensor of a mobile device;
means for orienting the mobile device toward an endpoint;
means for estimating a height of the mobile device;
means for receiving tilt-related data from the tilt-sensitive sensor;
means for estimating a tilt of the mobile device based at least in part on the received tilt-related data;
means for emitting a first signal;
means for detecting a reflected signal; and
means for estimating a distance between the mobile device and an endpoint,
wherein at least one of the means for estimating the height and the means for estimating the distance analyzes a time associated with the reflected signal, and wherein the estimated multi-dimensional distance is based on the reflected signal, estimated tilt and estimated height.

18. The system of claim 17, wherein the means for estimating the height of the mobile device comprise a height estimator accessing an empirical height database.

19. The system of claim 17, wherein the means for receiving tilt-related data comprise the tilt-sensitive sensor, and wherein the tilt-sensitive sensor comprises an accelerometer.

20. The system of claim 17, wherein the means for emitting the first signal comprise a sonar projector.

21. The system of claim 17, wherein the means for detecting the second signal comprise an acoustic transducer.

22. The system of claim 17, wherein the time is relative to a second time of an emitted signal corresponding to the reflected signal.

23. A non-transitory computer-readable medium containing a program which executes steps of:
calibrating a tilt-sensitive sensor of a mobile device;
orienting the mobile device toward an endpoint;
estimating a height of the mobile device;
receiving tilt-related data from the tilt-sensitive sensor;
estimating a tilt of the mobile device based at least in part on the received tilt-related data;
causing a first signal to be emitted;
detecting a reflected signal; and
estimating a multi-dimensional distance between the mobile device and an endpoint,
wherein at least one of the estimated height and the estimated multi-dimensional distance is based on the detected reflected signal, estimated tilt and estimated height.

24. The non-transitory computer-readable medium of claim 23, wherein estimating the distance comprises applying a triangulation technique.

25. The non-transitory computer-readable medium of claim 23, wherein the program further executes a step of:
presenting instructions to orient the mobile device such that a signal-emitting component of the mobile device is oriented towards the endpoint.

26. The non-transitory computer-readable medium of claim 23, wherein the program further executes a step of:
estimating a device-independent distance based on the estimated multi-dimensional distance and an estimated second multi-dimensional distance.

* * * * *